(12) United States Patent
Lusich

(10) Patent No.: US 11,658,512 B1
(45) Date of Patent: May 23, 2023

(54) ENERGY STORAGE SYSTEM USING EARTH MATERIALS

(71) Applicant: Anthony Nicholas Lusich, Bakersfield, CA (US)

(72) Inventor: Anthony Nicholas Lusich, Bakersfield, CA (US)

( * ) Notice: Subject to any disclaimer, the term of this patent is extended or adjusted under 35 U.S.C. 154(b) by 0 days.

(21) Appl. No.: 17/699,642

(22) Filed: Mar. 21, 2022

(51) Int. Cl.
  *H02J 15/00* (2006.01)
  *H02J 3/28* (2006.01)
  *H02K 7/18* (2006.01)
  *F03G 3/00* (2006.01)

(52) U.S. Cl.
  CPC ............ *H02J 15/007* (2020.01); *F03G 3/094* (2021.08); *H02J 3/28* (2013.01); *H02K 7/1869* (2013.01); *F05B 2220/7064* (2013.01); *F05B 2260/422* (2020.08); *F05B 2260/50* (2013.01)

(58) Field of Classification Search
  CPC ........... H02J 15/007; H02J 3/28; F03G 3/094; H02K 7/1869; F05B 2220/7064; F05B 2260/422; F05B 2260/50
  See application file for complete search history.

(56) References Cited

U.S. PATENT DOCUMENTS

| | | | | |
|---|---|---|---|---|
| 9,957,018 B1* | 5/2018 | Angeliev | ................. | H02K 7/07 |
| 2015/0048622 A1* | 2/2015 | Schegerin | ............ | H02J 15/007 |
| | | | | 290/1 R |
| 2020/0284238 A1* | 9/2020 | Heinonen | ............. | F03B 13/264 |
| 2021/0404446 A1* | 12/2021 | Pedretti | .................... | F03G 3/094 |
| 2022/0065231 A1* | 3/2022 | Colt | ........................ | E21B 47/10 |

\* cited by examiner

*Primary Examiner* — Joseph Ortega
(74) *Attorney, Agent, or Firm* — Fenwick & West LLP

(57) ABSTRACT

An energy storage system stores power received from a power grid as potential energy in compressed earth materials. The energy storage system includes a motor-generator coupled to an anchor via a tensile member. The motor-generator is configured to apply a tensile force to the tensile member. The tensile force causes the motor-generator and the anchor to apply a compression force to the earth materials in the ground, and causes the anchor to displace, thereby storing the received power as potential energy. The energy storage system provides power to the power grid by relieving some of the tensile force on the tensile member and thereby relieving some of the compression force on the earth materials. The anchor displaces towards its original position, and thereby causes the motor-generator to generate electrical power from the stored potential energy.

20 Claims, 7 Drawing Sheets

ENERGY STORAGE SYSTEM USING EARTH MATERIALS

BACKGROUND

As mankind moves away from fossil fuels for electrical power generation towards renewable resources, solar power and wind power have become more common sources of electricity. However, these renewable resources do not provide consistent sources of power. For example, solar panels do not produce power at night and are not effective when weather blocks light from the sun. Similarly, wind turbines do not produce power when the wind is not blowing. Thus, many renewable sources of energy are not consistent enough to provide sufficient power throughout the day. Furthermore, solar power and wind power do not easily adjust their power output in response to changes in demand throughout the day. For example, solar panels tend to produce the most energy around midday, when the sunlight is the strongest. However, demand for electricity may peak in the evening when people return home from work.

To counteract the inconsistency of renewable resources, the energy generated through renewable resources may be stored in an energy storage system. For example, a common conventional solution to this problem is to store excess power produced by renewable energy sources in lithium-ion batteries. These batteries are charged when renewable energy sources produce more power than is demanded by consumers, and provide power to consumers when renewable energy sources produce less power than is demanded by consumers. However, lithium-ion batteries can be expensive to produce and require specialized metals, like lithium. Additionally, manufacturing and disposing of batteries can further add to the pollution of the environment. Furthermore, facilities using lithium-ion batteries to store energy generally require highly trained technicians to operate and maintain the equipment.

SUMMARY

Described herein is an energy storage system that stores received electrical power as potential energy in earth materials in the ground. The energy storage system may include a motor-generator that is coupled to an anchor via a tensile member. To store energy in the energy storage system, the motor-generator receives power from a power generation system or power grid and uses the power to exert a tensile force on the tensile member. The tensile force exerted by the motor-generator may cause the anchor to displace due to the tensile force applied to the tensile member by the motor-generator. This displacement may apply a compression force to the earth materials in the ground between the motor-generator and the anchor. By compressing the earth materials, the energy storage system thereby stores the received power as potential energy through the compression force applied to the ground by the tensile member.

To provide power to the power grid, the motor-generator may relieve the tensile force on the tensile member. This may cause the anchor to return to its original position from its displaced position. As the tensile member is pulled by the anchor while the anchor is returning to its original position, the tensile member may pull on the motor-generator, causing the motor-generator to generate electrical power. This electrical power may then be provided to the power grid.

Since the energy storage system relies on compressing earth materials to store energy, the energy storage system can be broadly used to store energy generated by a variety of power generation systems without requiring specialized materials. Similarly, the energy storage system may be simpler to construct than conventional energy storage systems, relying on relatively few components to store energy.

DETAILED DESCRIPTION

Figure 1A:
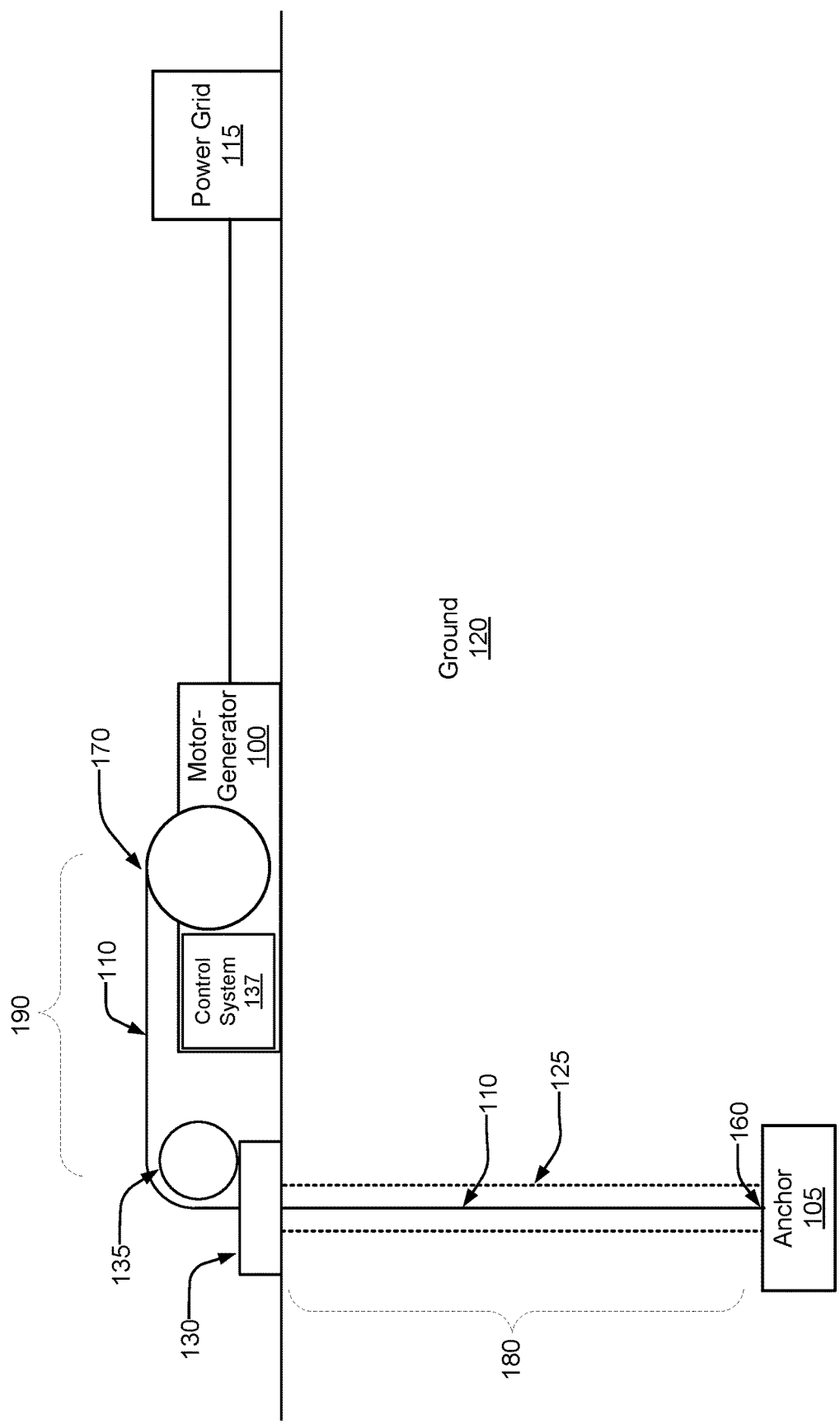
FIG. 1A illustrates an example energy storage system, in accordance with some embodiments.

FIG. 1A illustrates an example energy storage system, in accordance with some embodiments. Alternative embodiments may include more, fewer, or different components from those illustrated in FIG. 1.

The energy storage system illustrated in FIG. 1A includes a motor-generator 100 that is coupled to an anchor 105 through a tensile member 110. The motor-generator 100 is a mechanism that can be used to convert electrical energy into mechanical energy. The motor-generator may be supported on a structural foundation so that forces may be transmitted to the underlying earth materials for structural support. The motor-generator 100 can also be used to convert mechanical energy into electrical energy. The motor-generator 100 may use one motor unit for the conversion of electrical energy to mechanical energy and may use a separate generator unit for the conversion of mechanical energy to electrical energy. Alternatively, the motor-generator 100 may use the same unit to convert electrical energy to mechanical energy and vice versa. The motor-generator 100 may include one or more electrical motors, electrical generators, or electrical dynamos.

The tensile member 110 is coupled to the motor-generator 100 at a first end 170 and the anchor 105 at a second end 160 and is used by the motor-generator 100 to exert a tensile force that pulls on the anchor 105. The tensile member 110 referred to herein represents a set of similar structures that perform similar functions in the energy storage system. For example, while the tensile member 110 may comprise a metal cable, the tensile member 110 may also include rope, rods, wire, or cords, and may be made of other materials, such as natural fibers, artificial fibers, or synthetic polymers.

The anchor 105 is embedded in the ground 120 at the bottom of a bore hole 125 through which the tensile member 110 is coupled to the anchor 105. The anchor 105 may include a mechanical, concrete, grouted, driven-pile, or other anchoring device. The anchor 105 may be embedded in the ground 120 by removing earth materials from the ground 120 to create the bore hole 125 and the anchor 105 may be installed at the bottom of the bore hole 125. Earth materials may be replaced on top of the anchor 105 to secure the anchor 105 in the ground 120. The bore hole 125 may include a casing to retain the surrounding earth materials and to provide strength to the walls of the bore hole 125.

The ground 120 is made up of earth materials, such as soil, dirt, clay, sand, rock, or bedrock. The energy storage system may include a foundation 130 at the top of the bore hole 125 for supporting the bore hole 125 and redirecting the tensile member 110 from a vertical orientation (e.g., vertical orientation 180) within the bore hole 125 to another orientation (e.g., horizontal orientation 190) to be coupled to the motor-generator 100. The foundation 130 may include steel reinforced concrete, driven-pile foundation, or screw-pile foundation. In some embodiments, the foundation 130 includes a mechanism 135 that redirects the orientation of the tensile member 110. For example, the mechanism 135 may include a pully, gears, wheels, or levers. In some embodiments, the mechanism 135 changes the mechanical ratio of movements between the tension member 110 and the motor-generator 100.

The motor-generator 100 is also electrically coupled to a power grid 115. The power grid 115 may include power sources, such as power plants. Additionally, the power grid 115 may include consumers of power, such as houses, apartments, businesses, and factories. The motor-generator 100 is configured to receive power from the power grid 115 to store in the energy storage system. Similarly, the motor-generator 100 is configured to provide power to the power grid 115 from energy stored in the energy storage system.

In some embodiments, the energy storage system includes a control system 137 that controls the functionality of the energy storage system. While the control system 137 is illustrated in FIG. 1A as being part of the motor-generator 100, the control system 137 may be a separate component of the energy storage system from the motor-generator 100 in alternative embodiments. The control system 137 may control when the energy storage system receives and power from the power grid 115 and when the energy storage system provides power to the energy grid 115. The control system 137 also may determine how much energy is stored in the energy storage system and may ensure that the energy stored in the energy storage system does not exceed an energy capacity of the energy storage system. The control system 137 may comprise one or more processors and one or more computer-readable media that store instructions that are executed by the one or more processors. In some embodiments, the control system 137 comprises an application-specific integrated circuit.

Figure 1B:
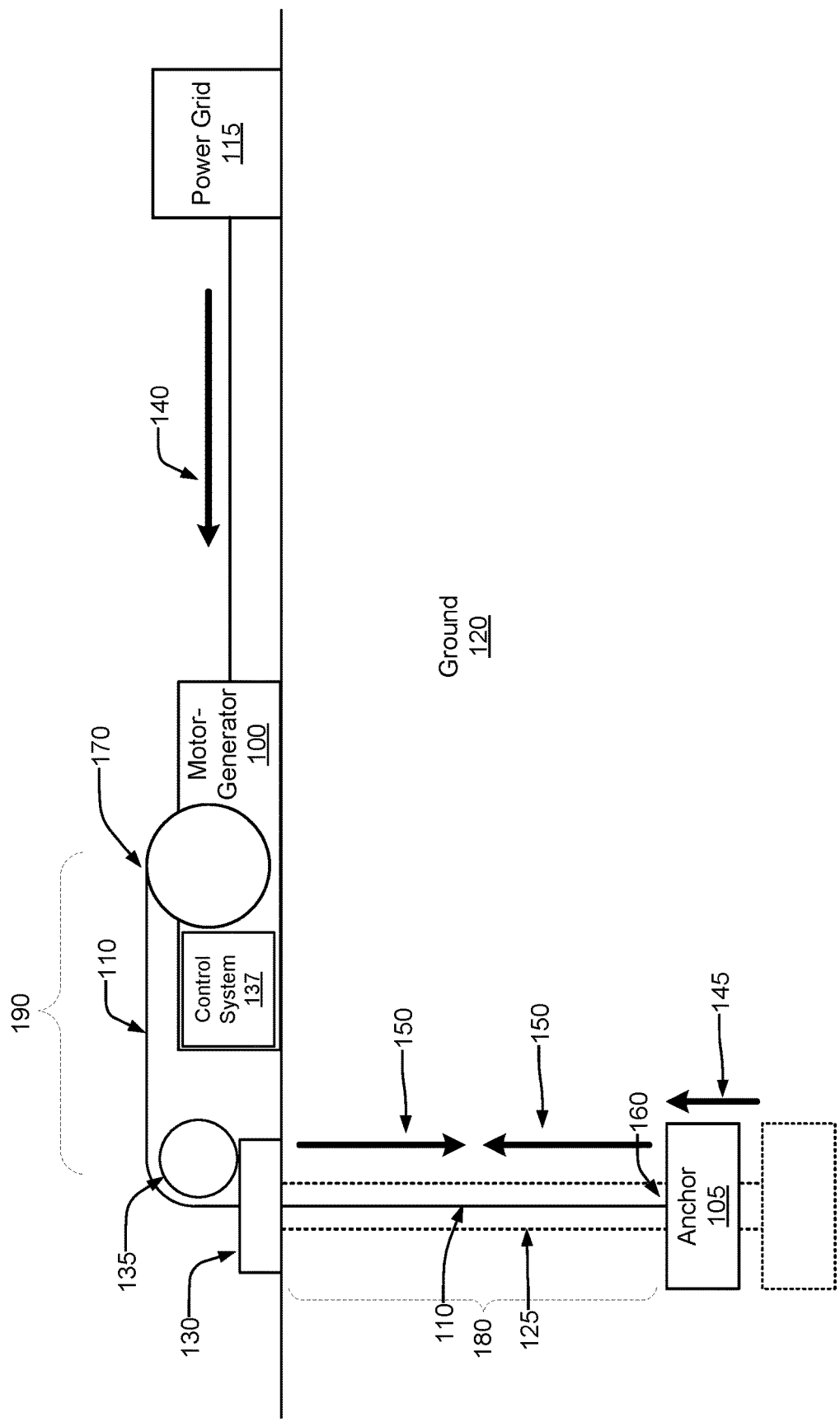
FIG. 1B illustrates how the energy storage system of FIG. 1A stores energy, in accordance with some embodiments.

FIG. 1B illustrates how the energy storage system of FIG. 1A stores energy, in accordance with some embodiments. The motor-generator 100 receives power 140 from the power grid 115 to store in the energy storage system. The motor-generator 100 uses the received power 140 to pull on the tensile member 110. By pulling on the tensile member 110, the motor-generator 100 exerts a tensile force on the tensile member 110. The tensile force may cause the anchor 105 to displace 145 and thereby apply a compression force 150 on the earth material in the ground 120 between the foundation 130 and the anchor 105. The energy storage system thereby stores energy in the potential energy stored in the compressed earth material. In some embodiments, the foundation 130 may displace to apply the compression force 150 to the earth material in the ground 120, instead of or in addition to the anchor 105.

The potential energy stored in the energy storage system may be stored as an elastic potential energy. The elastic potential energy stored by the energy storage system may be stored by the compression force applied by displacement of the anchor 105 or the foundation 130. For example, if the anchor 105 is displaced by a distance d, the elastic potential energy stored by the energy storage system may be $\frac{1}{2} kd^2$, for some spring constant k.

The motor-generator 100 may increase the tensile force applied to the tensile member 110 to store more energy in the energy storage system. In some embodiments, the motor-generator 100 exerts a tensile force on the tensile member 110 until an energy capacity of the energy storage system is reached. The energy capacity of the energy storage system is the maximum amount of energy that the energy storage system is able to store in earth materials of the ground 120. When the energy storage system receives power 140 from the energy grid 115, the motor-generator 100 may use the power 140 to increase the tensile force on the tensile member 110, thereby storing more energy in the energy storage system.

The composition of earth materials in the ground 120 may impact the energy capacity the energy storage system. If the ground 120 has a higher concentration of sand or organic materials, then the energy storage system may have a higher energy capacity. Similarly, if the ground 120 has a higher concentration of clay or bedrock, then the energy storage system may have a lower energy capacity.

In some embodiments, the energy capacity of the energy storage system depends on the elastic limit of the earth materials in the ground 120. The elastic limit of the earth materials in the ground 120 is the amount of stress that the energy storage system can apply to the earth materials before the earth materials permanently deform. In other words, the elastic limit represents the boundary between elastic deformation and plastic deformation of the earth materials. If the earth materials have a high elastic limit, then the energy storage system can apply a greater stress on the earth materials before the earth materials permanently deform. Therefore, the energy storage system can apply a greater compression force on the earth materials without losing energy due to the deformation of the earth materials, and thus has a higher energy capacity. Similarly, if the earth materials have a low elastic limit, then the energy storage system cannot apply as great of a compression force to the earth materials, and thus has a lower energy capacity.

The energy capacity of the energy storage system may be determined based on testing done on the earth material in the ground 120. For example, a sample of the earth material may be collected and a range of stresses may be applied to the sample to determine the elasticity of the earth materials. The energy capacity of the energy storage system may be determined based on the tests of the earth materials.

Figure 1C:
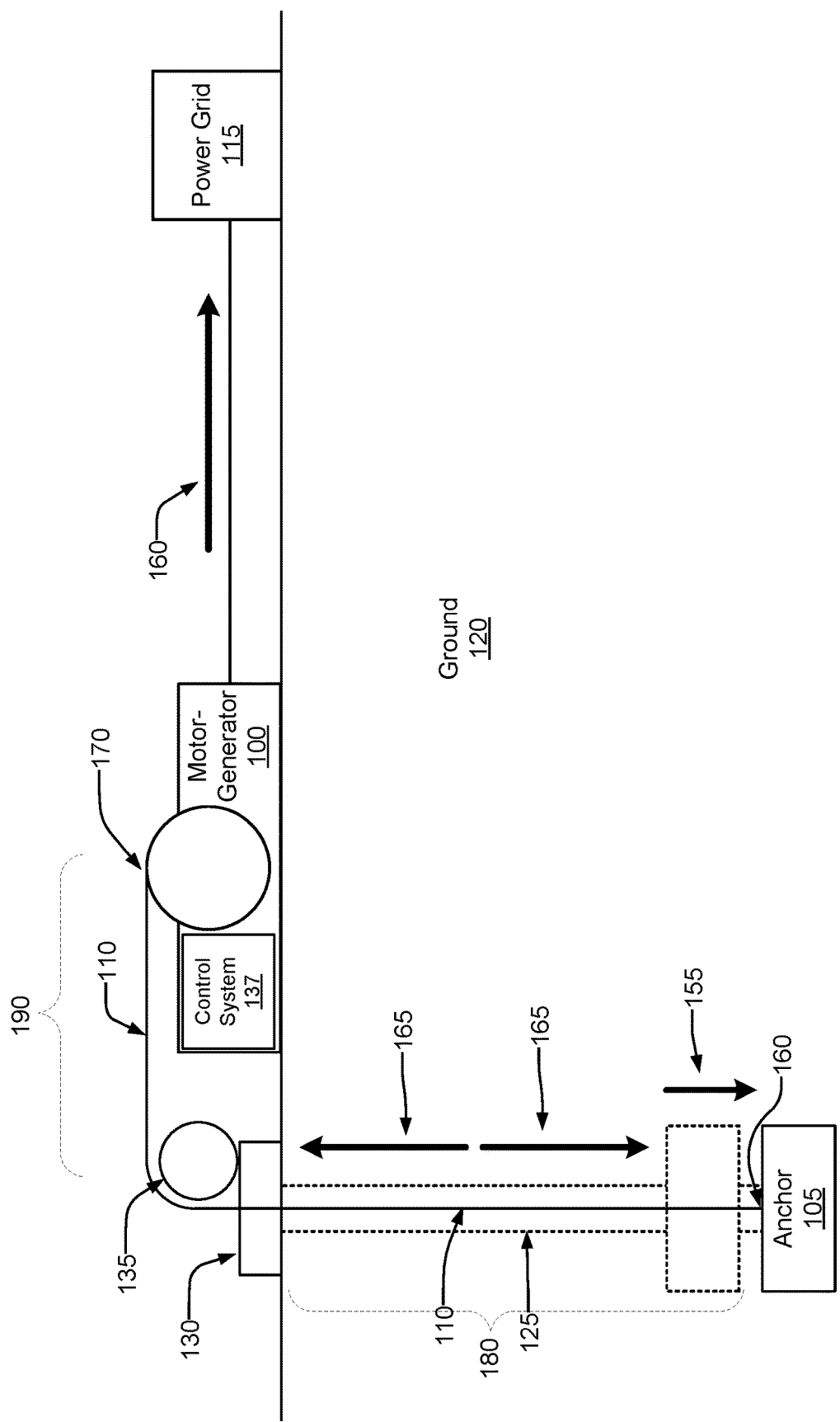
FIG. 1C illustrates how the energy storage system of FIG. 1A provides power to a power grid, in accordance with some embodiments.

FIG. 1C illustrates how the energy storage system of FIG. 1A provides power 160 to a power grid 115, in accordance with some embodiments. The motor-generator 100 uses the tension in the tensile member 110 to generate power. As the elastic force 165 acts on the anchor 105, the tension in the tensile member may cause the motor-generator 100 to turn, thereby creating electrical power. The motor-generator 100 may provide the generated power 160 to the power grid 115. As the tension in the tensile member 110 is reduced, the anchor 105 may be displaced 155 by the elastic force 165 towards its original position. When the tension in the tensile member 110 is fully reduced, then the energy storage system no longer stores energy and the anchor 105 may be at its original position.

Figure 2:
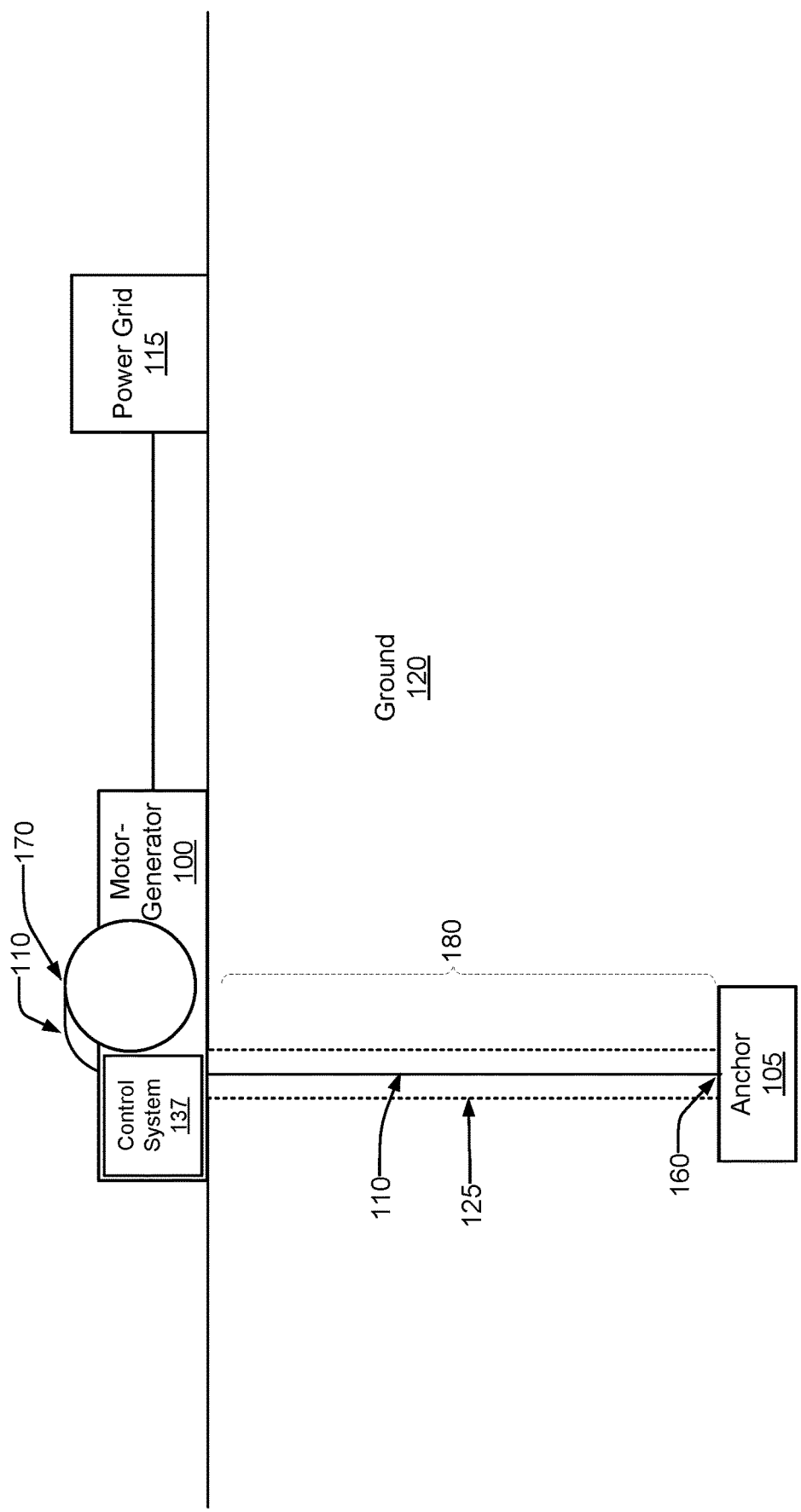
FIG. 2 illustrates an alternative configuration of an energy storage system, in accordance with some embodiments.

FIG. 2 illustrates an alternative configuration of an energy storage system, in accordance with some embodiments. In FIG. 2, the motor-generator 100 is located directly above the borehole 125. The motor-generator 100 may pull directly on the tensile member 110 to apply tension to the tensile member when receiving power from the power grid 115. In this configuration, the energy storage system may use less horizontal space than the configuration illustrated in FIGS. 1A-C.

Figure 3A:
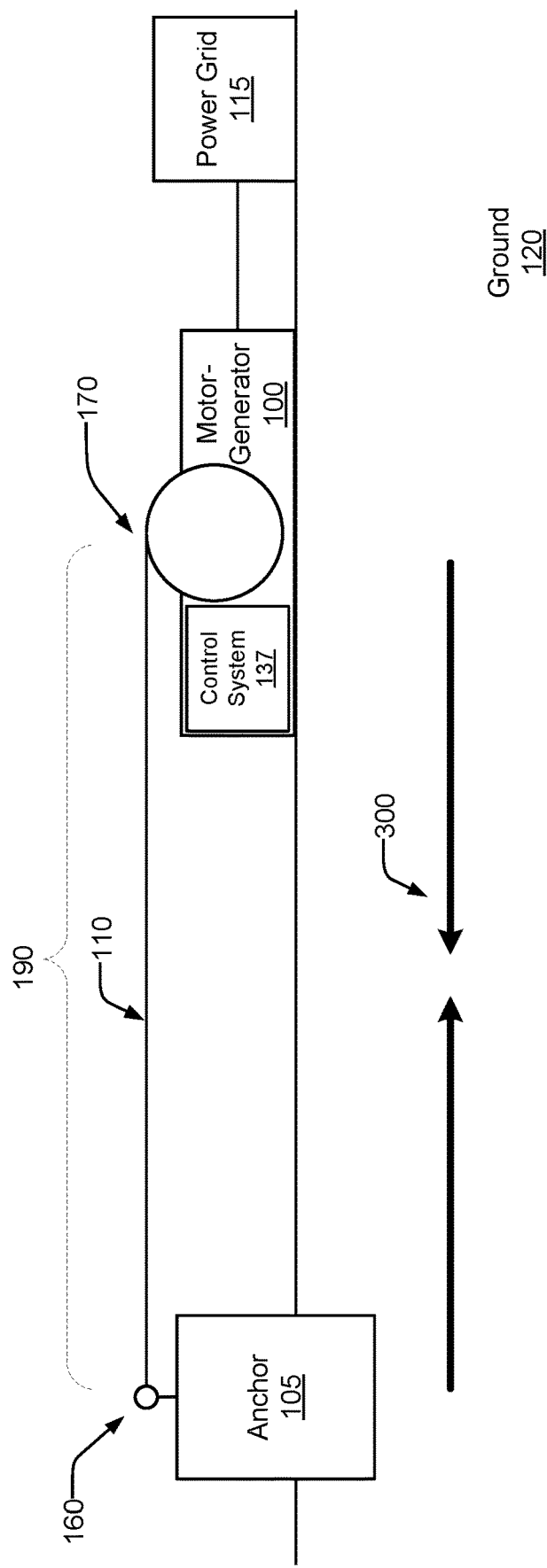
FIG. 3A illustrates an example horizontal configuration of an energy storage system, in accordance with some embodiments.

FIG. 3A illustrates an example horizontal configuration of an energy storage system, in accordance with some embodiments. In this configuration, the energy storage system may be more economical to construct, but may have a lower energy capacity and require more horizontal space to construct. The motor-generator 100 is coupled to the anchor 105 through the tensile member 110. The motor-generator 100 may apply a tensile force to the tensile member 110, and may thereby apply a compression force 300 to the earth materials of the ground 120. The anchor 105 may be embedded in the ground 120 such that the anchor 105 displaces when the motor-generator 100 applies a tensile force on the tensile member 110, and such that the anchor 105 substantially returns to its original position when the motor-generator 100 no longer applies a tensile force to the tensile member.

Figure 3B:
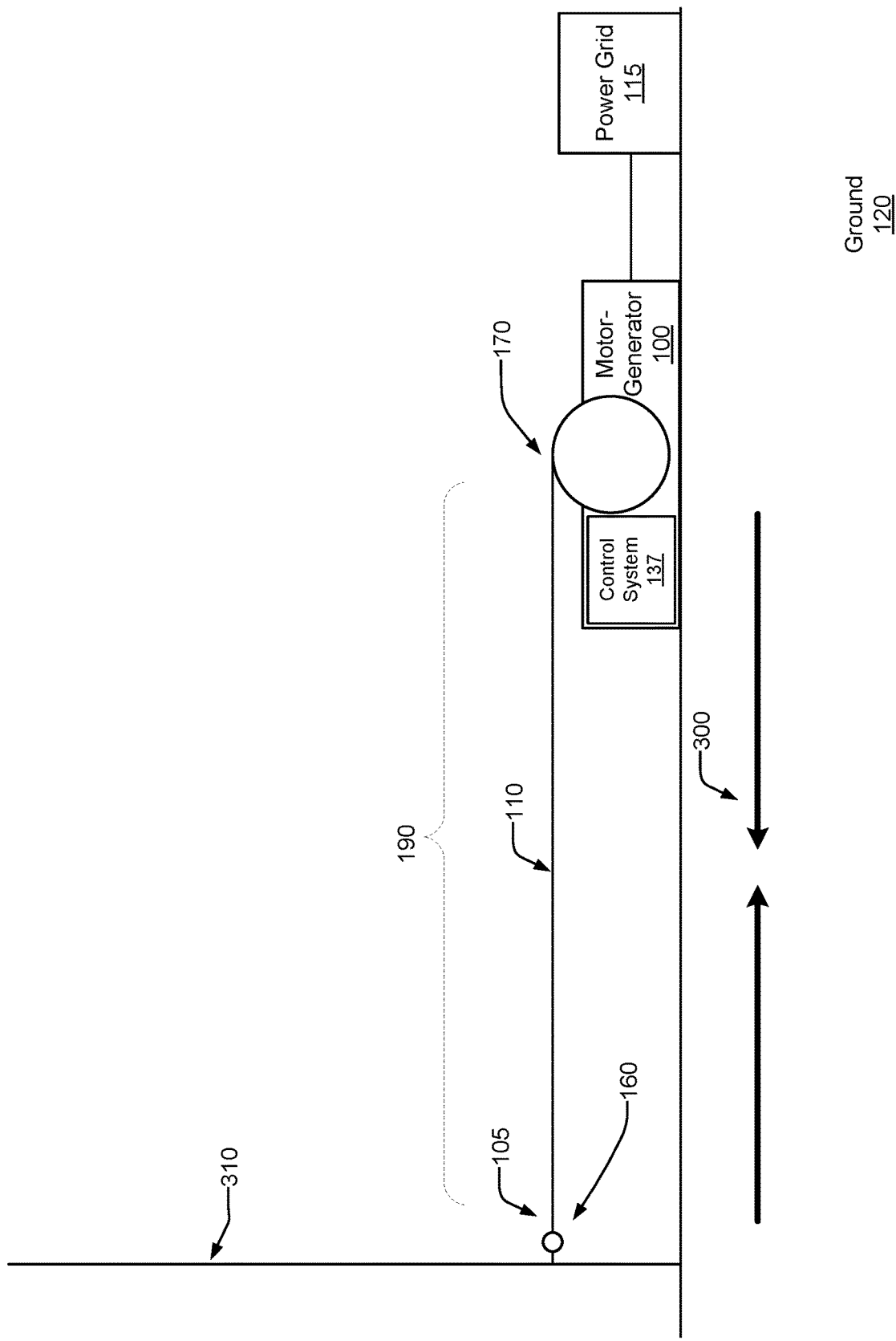
FIG. 3B illustrates another example horizontal configuration of an energy storage system, in accordance with some embodiments.

FIG. 3B illustrates another example horizontal configuration of an energy storage system, in accordance with some embodiments. In the embodiment illustrated in FIG. 3B, the motor-generator 100 is coupled to a vertical surface 310 through a tensile member 110. The vertical surface 310 may be any substantially vertical surface into which the anchor 105 may be embedded such that the motor-generator 100 can exert a tensile force on the tensile member 110. For example, the vertical surface 310 may be a cliff, a building, a mountain, or a hill. The tensile force exerted by the motor-generator 100 on the tensile member 110 may cause the motor-generator 100 to apply a compression force 300 on the earth materials in the ground 120.

Figure 4:
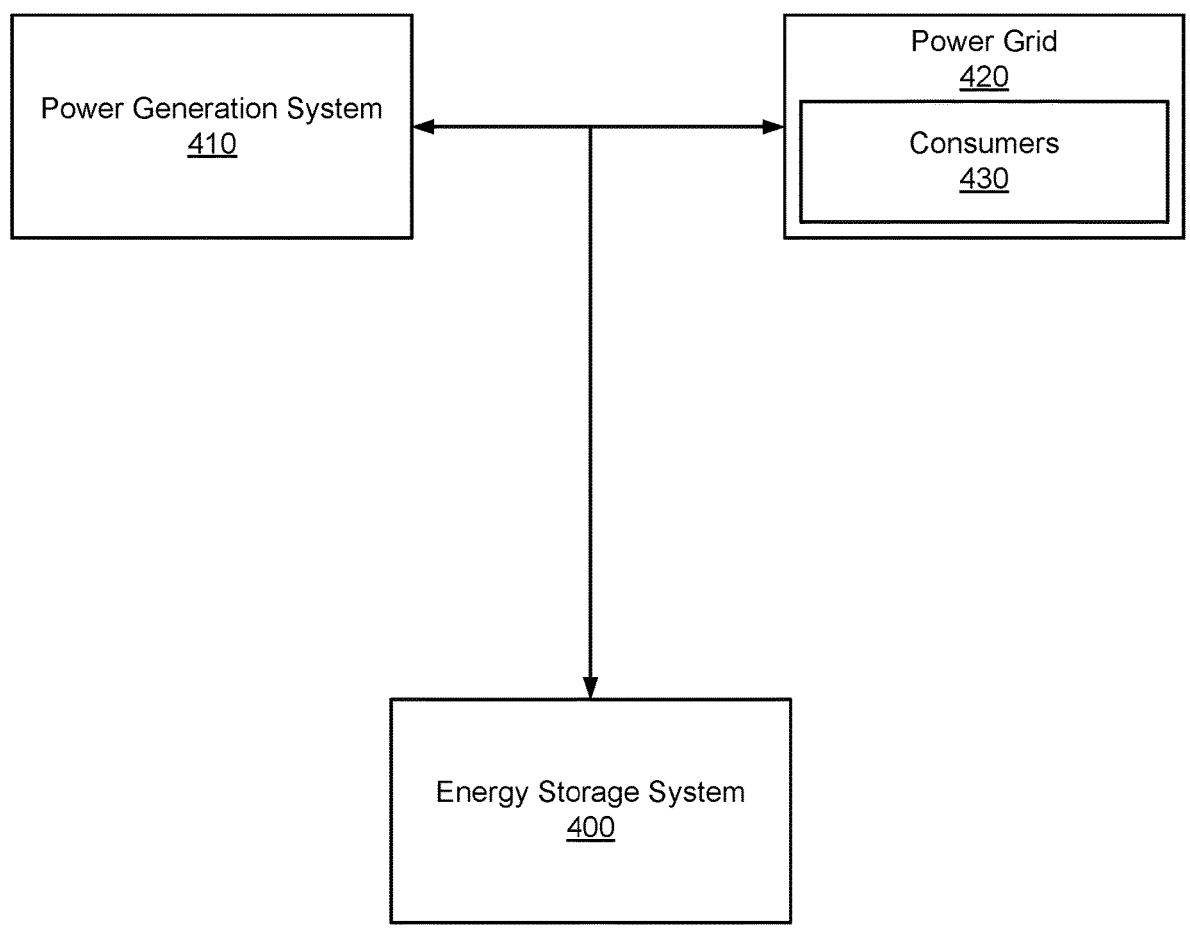
FIG. 4 illustrates an example system environment for an energy storage system 400, in accordance with some embodiments.

FIG. 4 illustrates an example system environment for an energy storage system 400, in accordance with some embodiments. Alternative embodiments may include more, fewer, or different components from those illustrated in FIG. 4, and the functionalities and structures of each of the components may be divided up differently from the description below.

The energy storage system 400 is electrically coupled to a power generation system 410. The power generation system 410 is a system that generates power and provides the power to the energy storage system 400 and the power grid 420. For example, the power generation system 410 may include one or more of a coal power plant, a natural gas power plant, a solar panel, a wind turbine, or a nuclear power plant. The energy storage system 400 may receive power from the power generation system 410 and store the power as energy in the energy storage system 400.

The energy storage system 400 is electrically coupled to a power grid 420. The power grid 420 is a network for delivering electricity from producers of electrical power to consumers of electrical power. For example, the power grid 420 may include power stations, electrical substations, electrical power transmission lines, and electrical power distribution lines. The power grid 420 may carry power to consumers, such as houses, apartments, businesses, or factories.

The power grid 420 may receive electrical power from the energy storage system 400 and provide the received power to consumers of the power. Similarly, the power grid 420 may receive power from the power generation system 410 and provide the received power to consumers 430. In some embodiments, the power grid 420 carries power generated by the power generation system 410 to the energy storage system 400.

ADDITIONAL CONSIDERATIONS

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A method for storing energy in earth materials comprising:
    storing elastic potential energy in the earth materials by applying a compression force on the earth materials, wherein applying the compression force on the earth materials comprises:
        applying a tensile force to a tensile member by a motor-generator, wherein the tensile member is coupled to the motor-generator at a first end of the tensile member, and wherein the tensile member is coupled to an anchor at a second end of the tensile member;
    storing the elastic potential energy in the earth materials for a period of time without substantially receiving electrical power at the motor-generator and without substantially generating electrical power by the motor-generator; and
    generating, by the motor-generator at a time after the period of time, electrical power by releasing the stored potential energy, wherein releasing the stored potential energy comprises reducing the compression force on the earth materials, and wherein reducing the compression force on the earth materials comprises reducing the tensile force applied to the tensile member by the motor-generator.

2. The method of claim 1, further comprising:
    receiving initial electrical power from a power grid coupled to the motor-generator;
    storing the initial electrical power as elastic potential energy in the earth materials by applying the compression force on the earth materials;
    generating the electrical power by releasing the stored elastic potential energy; and
    providing the electrical power to the power grid.

3. The method of claim 2, further comprising:
    receiving additional electrical power from the power grid; and
    storing the additional electrical power by increasing the compression force on the earth materials, wherein increasing the compression force on the earth materials comprises increasing the tensile force applied to the tensile member by the motor-generator.

4. The method of claim 1, wherein the anchor is embedded in the ground.

5. The method of claim 4, wherein the compression force is applied to the earth materials based on a displacement of the anchor.

6. The method of claim 4, wherein the motor-generator is situated directly above the anchor.

7. The method of claim 6, wherein the compression force is applied to the earth materials based on a displacement of the motor-generator.

8. The method of claim 4, wherein the tensile member is reoriented from a horizontal orientation to a vertical orientation by a pulley, and wherein the pulley is coupled to a foundation.

9. The method of claim 8, wherein the compression force is applied by the earth materials based on a displacement of the foundation.

10. The method of claim 1, wherein the anchor is embedded in a vertical surface.

11. An energy storage system comprising:
    an anchor configured to store elastic potential energy in earth materials by applying a compression force on the earth materials;
    a tensile member comprising a first end and a second end, wherein the first end of the tensile member is coupled to the anchor, wherein the tensile member is configured to cause apply a compression force on the earth materials when a tensile force is applied to the tensile member; and
    a motor-generator coupled to the second end of the tensile member, wherein the motor-generator is configured to:
        apply a tensile force to the tensile member;
        store elastic potential energy in the earth materials for a period of time without substantially receiving electrical power and without substantially generating electrical power; and
        generate electrical power, at a time after the period of time, by releasing elastic potential energy stored in the earth materials, wherein releasing the stored potential energy comprises reducing the compression force on the earth materials, and wherein reducing the compression force on the earth materials comprises reducing the tensile force applied to the tensile member by the motor-generator.

12. The energy storage system of claim 11, wherein the motor-generator is electrically coupled to a power grid, and wherein the motor-generator is further configured to:
    receive initial electrical power from a power grid coupled to the motor-generator;
    cause elastic potential energy to be stored in earth materials by applying a tensile force to the tensile member based on the received the initial electrical power;
    generate the electrical power by releasing the stored elastic potential energy; and
    provide the electrical power to the power grid.

13. The energy storage system of claim 12, wherein the motor-generator is further configured to:
    receive additional electrical power from the power grid; and
    cause the additional electrical power to be stored by increasing the compression force on the earth materials, wherein increasing the compression force on the earth materials comprises increasing the tensile force applied to the tensile member by the motor-generator.

14. The energy storage system of claim 11, wherein the anchor is embedded in the ground.

15. The energy storage system of claim 14, wherein the compression force is applied to the earth materials based on a displacement of the anchor.

16. The energy storage system of claim 14, wherein the motor-generator is situated directly above the anchor.

17. The energy storage system of claim 16, wherein the compression force is applied to the earth materials based on a displacement of the motor-generator.

18. The energy storage system of claim 14, further comprising a pulley that is coupled to a foundation, wherein the tensile member is reoriented from a horizontal orientation to a vertical orientation by the pulley.

19. The energy storage system of claim 18, wherein the compression force is applied by the earth materials based on a displacement of the foundation.

20. The energy storage system of claim 11, wherein the anchor is embedded in a vertical surface.

* * * * *